United States Patent
Olson et al.

(10) Patent No.: US 11,593,309 B2
(45) Date of Patent: Feb. 28, 2023

(54) RELIABLE DELIVERY OF EVENT NOTIFICATIONS FROM A DISTRIBUTED FILE SYSTEM

(71) Applicant: International Business Machines Corporation, Armonk, NY (US)

(72) Inventors: John T. Olson, Tucson, AZ (US); Deepavali M. Bhagwat, Cupertino, CA (US); Frank Schmuck, Campbell, CA (US); Shekhar Amlekar, Pune (IN); Luis Teran, Tucson, AZ (US); Jacob Morris Tick, Tucson, AZ (US); April Brown, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/089,851

(22) Filed: Nov. 5, 2020

(65) Prior Publication Data

US 2022/0138158 A1    May 5, 2022

(51) Int. Cl.
*G06F 16/00*  (2019.01)
*G06F 16/17*  (2019.01)
(Continued)

(52) U.S. Cl.
CPC .......... *G06F 16/1734* (2019.01); *G06F 9/542* (2013.01); *G06F 12/0815* (2013.01);
(Continued)

(58) Field of Classification Search
CPC .. G06F 16/1734; G06F 16/182; G06F 16/542; G06F 16/2358; G06F 16/128;
(Continued)

(56) References Cited

U.S. PATENT DOCUMENTS 5,933,838 A * 8/1999 Lomet ................. G06F 11/1471
6,502,133 B1   12/2002 Baulier
(Continued)

FOREIGN PATENT DOCUMENTS

CN    102750317 A    10/2012
CN    109669821 A    4/2019
(Continued)

OTHER PUBLICATIONS

L.M. Silva et al., "Using message semantics for fast-output commit in checkpointing-and-rollback recovery", Proceedings of the 32nd Annual Hawaii International Conference on Systems Sciences. 1999. HICSS-32, Jan. 1999, pp. 1-10.*
(Continued)

*Primary Examiner* — Srirama Channavajjala
(74) *Attorney, Agent, or Firm* — Aaron Pontikos

(57) ABSTRACT

Embodiments include a method for fault tolerance in the delivery of event information within a file system cluster. One or more processors to determine event information associated with file system activity performed by a node of the cluster. The one or more processors add the event information to an event log buffer in memory. The one or more processors receive a first log sequence number (LSN) associated with flushing of recovery information from a recovery log buffer. The one or more processors determine the event information in the event log buffer having a log sequence number less than or equal to the first log sequence number, and determining the event information includes log sequence numbers less than or equal to the first log sequence number, the one or more processors flush the corresponding event information from the event log buffer to disk storage.

25 Claims, 4 Drawing Sheets

(51) Int. Cl.
  *G06F 16/182* (2019.01)
  *G06F 9/54* (2006.01)
  *G06F 16/2455* (2019.01)
  *G06F 16/23* (2019.01)
  *G06F 12/0866* (2016.01)
  *G06F 12/0815* (2016.01)

(52) U.S. Cl.
  CPC ........ *G06F 12/0866* (2013.01); *G06F 16/182* (2019.01); *G06F 16/2358* (2019.01); *G06F 16/2379* (2019.01); *G06F 16/2455* (2019.01)

(58) Field of Classification Search
  CPC ............. G06F 12/0866; G06F 12/0815; G06F 16/2455; G06F 16/2379; G06F 11/1471
  See application file for complete search history.

(56) References Cited

U.S. PATENT DOCUMENTS

| | | | | |
|---|---|---|---|---|
| 8,266,114 | B2* | 9/2012 | Mace | G06F 11/1435 707/648 |
| 8,527,462 | B1* | 9/2013 | Talius | G06F 16/128 707/684 |
| 8,543,534 | B2 | 9/2013 | Alves | |
| 8,706,698 | B2* | 4/2014 | Bachar | G06F 9/52 707/661 |
| 9,069,827 | B1* | 6/2015 | Rath | G06F 16/25 |
| 9,081,888 | B2 | 7/2015 | Hsieh | |
| 9,325,757 | B2 | 4/2016 | Uhlig | |
| 9,391,892 | B2 | 7/2016 | Ansari | |
| 9,785,518 | B2* | 10/2017 | Kanteti | G06F 11/1471 |
| 9,946,607 | B2* | 4/2018 | Sundararaman | G06F 11/1088 |
| 10,061,816 | B2* | 8/2018 | Convertino | G06F 16/24573 |
| 10,127,120 | B2 | 11/2018 | Park | |
| 10,769,036 | B2* | 9/2020 | Earl | G06F 16/2365 |
| 11,263,235 | B2* | 3/2022 | Hrle | G06F 16/2455 |
| 2007/0220059 | A1* | 9/2007 | Lu | G06F 16/2358 |
| 2008/0046443 | A1* | 2/2008 | Fachan | G06F 12/0866 |
| 2008/0133615 | A1* | 6/2008 | Bradshaw | G06F 12/0866 |
| 2009/0328044 | A1* | 12/2009 | Bergheaud | G06F 11/2097 719/318 |
| 2010/0031274 | A1* | 2/2010 | Sim-Tang | G06F 11/1471 719/318 |
| 2011/0072207 | A1* | 3/2011 | Jin | G06F 16/2358 711/E12.001 |
| 2012/0254120 | A1* | 10/2012 | Fang | G06F 16/2379 707/648 |
| 2015/0149704 | A1* | 5/2015 | Lee | G06F 16/2358 711/135 |
| 2016/0170827 | A1* | 6/2016 | Errickson | G06F 11/0706 714/20 |
| 2018/0150397 | A1* | 5/2018 | Gupta | G06F 12/0815 |
| 2018/0204021 | A1* | 7/2018 | Long | G06F 21/60 |
| 2018/0307576 | A1* | 10/2018 | Debnath | G06F 11/34 |
| 2019/0129774 | A1 | 5/2019 | Konan | |
| 2020/0042365 | A1 | 2/2020 | Poojan | |

FOREIGN PATENT DOCUMENTS

| | | |
|---|---|---|
| CN | 111125040 A | 5/2020 |
| EP | 3365781 A1 | 8/2018 |
| WO | WO1999041664 A1 * | 8/1999 |
| WO | WO2005013154 A2 * | 2/2005 |
| WO | WO2006004766 A1 * | 1/2006 |
| WO | WO2008057528 A2 * | 5/2008 |
| WO | WO2014151237 A1 * | 9/2014 |
| WO | WO2014151986 A1 * | 9/2014 |
| WO | WO2015047833 A1 * | 4/2015 |
| WO | WO2016069188 A1 * | 5/2016 |

OTHER PUBLICATIONS

I. Lee et al.,"Error/failure analysis using event logs from fault tolerant systems", Digest of Papers. Fault-Tolerant Computing: The Twenty-First International Symposium, Jun. 1991, pp. 10-17.*

Ruipeng Yang et al., "nLSALog An Anomaly Detection Framework for Log Sequence in Security Management", Artificial Intelligence (AI)-Empowered Intelligent Transportation Systems, IEEE vol. 7, Nov. 2019, pp. 181152-181164.*

Yanfang Liu et al., "The Runtime System Problem Identification Method Based on Log Analysis", 27th International Conference on Computer Communication and Networks (ICCCN) (pp. 1-7), Oct. 2018.*

International Search Report and Written Opinion dated Jan. 19, 2022 from corresponding PCT application No. PCT/IB2021/059680 filed Oct. 20, 2021.

"Chapter 8, Reading from and writing to external systems", Stream Processing with Apache Flink, Jun. 4, 2019, 43 pps., <https://docplayer.net/137733401-Chapter-8-reading-from-and-writing-to-external-systems.html>.

* cited by examiner

RELIABLE DELIVERY OF EVENT NOTIFICATIONS FROM A DISTRIBUTED FILE SYSTEM

FIELD OF THE INVENTION

The present invention relates generally to the field of distributed file system operations, and more particularly to reliable persistence of event notifications of file system operations.

BACKGROUND OF THE INVENTION

Businesses operating in multiple geographies and utilizing clustered file systems often hosted in cloud environments are increasingly focused on data security and monitoring of data access and other file activity events. Protection of business-critical data from internal threats and external security breaches has led many companies to include auditing functionality of file systems.

Financial institutions as well as healthcare businesses have operational and legal needs to be able to determine access and editing activities to ledgers, accounts and transactions, medical records, and personnel files. Some consulting services rely on secure file system access and activity operations to support client needs and maintain a competitive position in the marketplace. In distributed computing environments in which clustered file systems may be employed, recovery of file system activity prior to node reboot crashes, or hanging conditions may include vital information or may even be required for compliance rules.

Distributed file systems often include a plurality of nodes performing operational activities on files, objects, or records of the system. The nodes may include a message queue distributed across the plurality of nodes that supports the collection of file activity or events performed on files by the respective node. The publishing of event activity to the message queue is performed by a "producer" component, running within a daemon on the node that applies policies configuring which files and event activities to be watched.

SUMMARY

Embodiments of the present invention disclose a method, computer program product, and system for fault tolerance in delivery of event information of nodes within a computer node cluster. The method provides for one or more processors to determine event information associated with file system activity performed by a node of a computer cluster of nodes. The one or more processors add the event information to an event log buffer in memory. The one or more processors receive a first log sequence number matching a recovery log sequence number corresponding to a flushing of recovery information from a recovery log buffer. The one or more processors determine the event information included in the event log buffer having a log sequence number less than or equal to the first log sequence number, and responsive to determining the event information included in the event log buffer corresponds to a log sequence number less than or equal to the first log sequence number, the one or more processors flush the event information having corresponding log sequence numbers from the event log buffer to disk storage.

DETAILED DESCRIPTION

Figure 1:
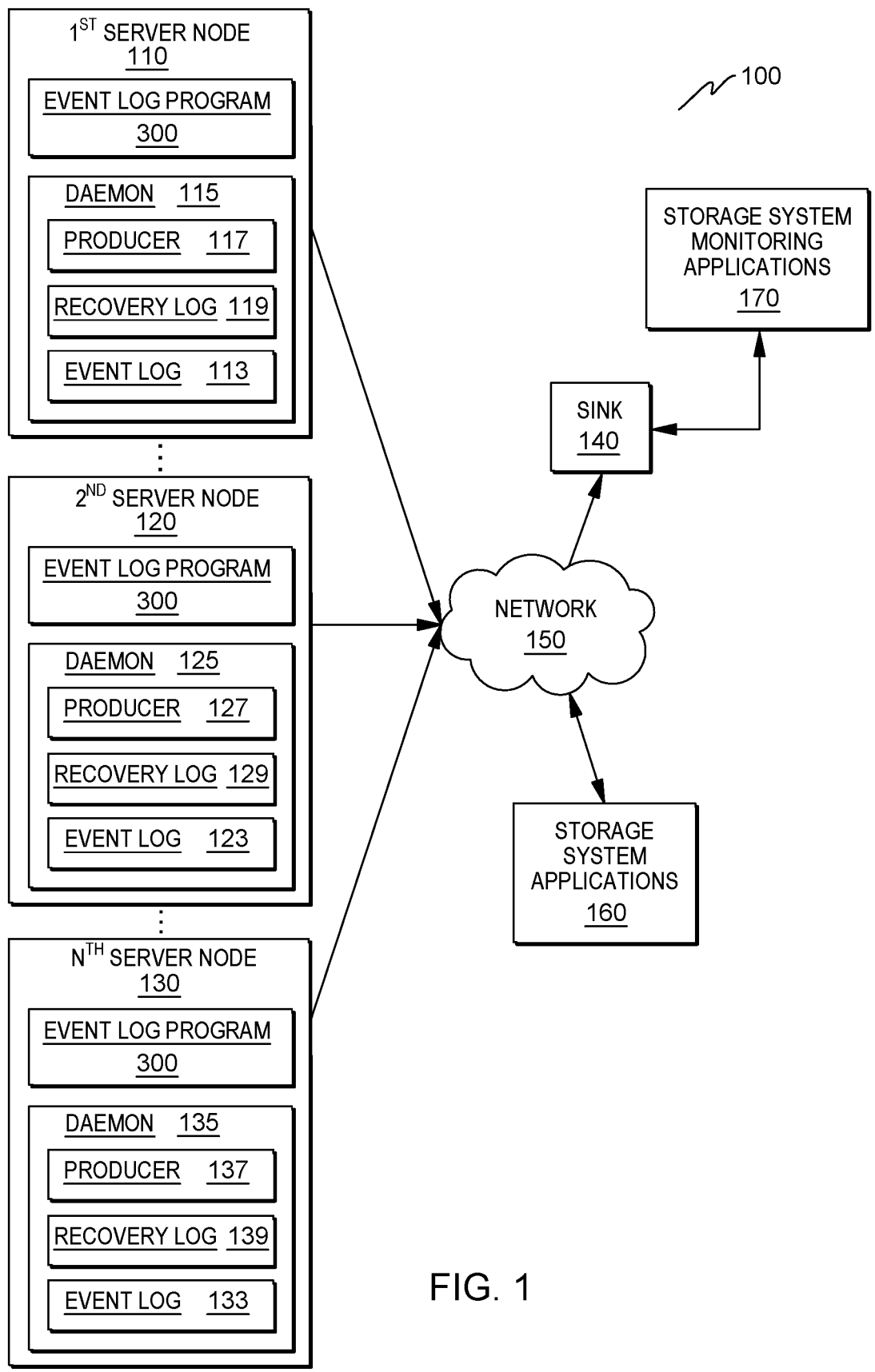
FIG. 1 is a functional block diagram illustrating a distributed data processing environment, in accordance with an embodiment of the present invention.

Embodiments of the present invention recognize that certain applications running on distributed computing environments that include clustered file systems are configured to produce and distribute event notifications associated with event activities of files. Embodiments of the present invention recognize that applications that monitor a file system require consistent and reliable status and activity associated with the file system and component data of the file system. File system monitoring applications rely on event notifications delivered to the applications as an input of status, access, and changes to the data content of the file system and interruption of the event notifications, which may occur due to node crashes, reboots, or other delivery issues may result in lost event information and require significant intervention to correct. The resiliency of event notification of the monitored file system is a significant issue of reliability for such applications. Storage systems may be designated for storage of files and documents or may be configured for storage of items as objects.

Embodiments of the present invention provide reliable delivery of event notification for storage management operations and activities, regardless of the content type stored. For brevity, discussion of embodiments will refer to "files," "file systems," and "file system cluster," without limitation to "objects" or other units of content.

Embodiments of the present invention provide a method, computer program product, and computer system for reliable delivery of event notifications of clustered file systems. In embodiments of the present invention, an event log buffer is included in respective operational nodes of the clustered file system and receives event metadata of file events performed by the respective node. In some embodiments of the present invention, the event log buffer has a corresponding event log that receives event information of file access and activity processed on the respective node from the event log buffer (i.e., flushed) and provides permanent storage of the event information (i.e., disk storage).

In embodiments of the present invention, the event log buffer is synchronized with the recovery log buffer, such that the event log buffer flushes memory-stored event information to disk, prior to a flushing of the corresponding data of the recovery log buffer to the recovery log on disk. In some embodiments, in response to an interruption of event notification delivery to a notification sink, the event information is replayed from the event log stored on disk, ensuring complete delivery of file system event information.

In some embodiments of the present invention, a node of a computer cluster operating a clustered file system includes a running daemon that has an event producer that generates event notifications corresponding to file system activity performed on the node. An event of a clustered file system may include, but is not limited to, activities such as access (and access ID), create, open, close, remove, edit changes, ownership changes, security level changes, and relocation. The producer of the node sends event information as metadata to the event log buffer and a sink. In one embodiment, the producer of the node sends event metadata to a message queue. Embodiments of the present invention recognize that a message queue and a sequential log on disk are embodiments of a sink. A message queue is a stream-processing software platform that provides handling of real-time, high-throughput data feeds. The message queue acks as a repository collecting event information notifications from respective distributed nodes of the file system cluster so the information can be consumed by interested applications. In one embodiment, the producer of a node writes event metadata to a sequential log file on persistent storage. The sink provides an access point for file system monitoring application to receive event notifications of activity of the file system and metadata of file or object status, changes, and access information.

Event information includes additional metadata associated with the respective file system event than data sent to the recovery log buffer and stored in the recovery log on disk. Embodiments of the present invention recognize that in the event of a node failure, the event information necessary to generate an event notification is not included in the recovery log, which is designed to perform a system component recovery of operations. The event log includes metadata such as, but not limited to i-node number, part name, storage pool, user ID, owner ID, file attributes, file event activity, and timestamp of the event.

Embodiments of the present invention ensure that the event notifications are reliably maintained and delivered even in the occurrence of a crash, reboot, or other system interruption by providing an event log buffer that flushes event information to persistent disk storage prior to flushing of the recovery information included in the recovery log buffer. The event log provides event information under fault conditions in which normal event activity information is undelivered to sinks.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes multiple server nodes of a distributed file system cluster represented as first server node 110, second server node 120 and intervening server nodes, (not shown), up to and including Nth server node 130. Distributed data processing environment 100 also includes sink 140, storage system applications 160, storage system monitoring applications 170, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between first server node 110, second server node 120 and intervening server nodes up to and including Nth server node 130, sink 140, storage system applications 160 and storage system monitoring applications 170.

First server node 110, second server node 120 and intervening nodes (not shown) up to Nth server node 130 are nodes of a distributed file system cluster. First server node 110 includes a copy of event log program 300, daemon 115, producer 117, event log 113, and recovery log 119. Second server node 120 includes a copy of event log program 300, daemon 125, producer 127, event log 123, and recovery log 129. Nth server node 130 includes a copy of event log program 300, daemon 135, producer 137, event log 133, and recovery log 139. In some embodiments of the present invention, event log program 300 may be hosted remotely from first server node 110, second server node 120 and Nth server node 130, and provide programmable instruction to the respective server nodes.

In some embodiments, first server node 110, second server node 120, and Nth server node 130 are computing devices configured to operate in a distributed environment and perform file system operations. In some embodiments, first server node 110, second server node 120, and Nth server node 130 can be blade servers, web servers, laptop computers, desktop computers, standalone mobile computing devices, smartphones, tablet computers, or other electronic devices or computing systems capable of receiving, sending, and processing data. In other embodiments, first server node 110, second server node 120, and Nth server node 130 may be computing devices interacting with applications and services hosted and operating in a cloud computing environment. In another embodiment, first server node 110, second server node 120, and Nth server node 130 can be netbook computers, personal digital assistants (PDAs), or other programmable electronic devices capable of generating and transmitting input to and receiving programming instructions from event log program 300. Alternatively, in some embodiments, first server node 110, second server node 120, and Nth server node 130 may be communicatively connected to event log program 300 operating remotely. First server node 110, second server node 120, and Nth server node 130 may include internal and external hardware components, depicted in more detail in FIG. 4.

Daemon 115, daemon 125, and daemon 135 are computer programs that run as a background process. Daemon 115, daemon 125, and daemon 135 enable producers 117, 127, and 137, respectively, to determine file system event activity occurring on respective nodes and generate event information associated with a specific file or object activity.

Producer 117, producer 127, and producer 137 are entities that operate within daemons 115, 125, and 135, respectively. Producers 117, 127, and 137 determine file system event activity on respective nodes and collect metadata for the event and publish the event and metadata to the message queue. In embodiments of the present invention, producers 117, 127, and 137 send event metadata to an event log buffer of the respective node, which is described in greater detail in the discussion of FIG. 2.

Recovery log 119, recovery log 129, and recovery log 139 are a collection of log files within first server node 110, second server 120, and Nth server 130, respectively, that include activity and state information enabling recovery of the respective node from a crash, reboot, or other processing interruption. Recovery logs 119, 129, and 139 reside on persistent storage in first server node 110, second server node 120, and Nth server node 130, respectively. Recovery logs 119, 129, and 139, receive the recovery information when corresponding recovery log buffers for the respective server node reaches or approaches a capacity limit and flushes the recovery information from the respective recovery log buffer in memory to the corresponding recovery log on disk.

Event log 113, event log 123, and event log 133 are log files of event activity and associated metadata of processing on first server node 110, second server node 120, and Nth server node 130. Event log 113, 123, and 133 reside in persistent storage and provide consistent event information in the event of interruption or malfunction of message queue delivery of event information to a designated sink. Event logs 113, 123, and 133, receive the event information when corresponding event log buffers for the respective server node reaches or approaches a capacity limit and flushes the event information from the respective event log buffer in memory to the corresponding event log on disk.

Event log program 300 is depicted as operating on each of first server node 110, second server node 120, and Nth server node 130. In some embodiments of the present invention, event log program 300 is a component of a distributed application that manages data of a clustered file system and is scalable to operate with a plurality of nodes operating in the file system cluster. File system monitoring applications use the file system event notifications to determine the state and status of the file system component files or objects, directories, and operational activities creating and accessing files/objects. Applications monitoring files systems can experience resiliency issues in which there are interruptions of event notification delivery to a sink from which the applications access the event notifications. Applications monitoring file systems may not be able to tolerate delivery failures, and embodiments of the present invention provide a reliable source of event notifications to replay and deliver to event notification sinks in the event of a fault condition of a node of the file system cluster.

In some embodiments, event log program 300 determines event activity and instructs the respective producer of the node to send event information, which includes event metadata, to the event log buffer of the node. In some embodiments, event log program 300 appends the event metadata of a particular event to a JSON file stored in the event log buffer. Each instance of event information receives a log sequence number (LSN) that corresponds to the same log sequence number of recovery information associated with the event that is stored in the recovery log buffer of the node. For a given event of file system activity, such as a "write" activity to a file, an LSN is assigned to the recovery information associated with the write event and sent to the recovery log buffer, and the same LSN is assigned to the event information of the write event that is sent to the event log buffer.

In some embodiments of the present invention, event log program 300 receives an LSN that corresponds to a set of recovery information in the recovery log buffer. The set of recovery information includes all recovery information having LSNs equal to or less than the LSN received by event log program 300. For example, the recovery log buffer is nearly at the capacity limit of recovery information and requires flushing the recovery information from the buffer to the recovery log in persistent disk storage. Flushing refers to the process of writing the content in volatile memory (i.e., buffer) to persistent storage on disk. The recovery log buffer identifies the LSN corresponding to an event previously performed on the node, such as LSN=1000. The recovery log buffer also includes multiple LSNs performed on the node prior to the event corresponding to LSN=1000. The recovery log buffer identifies the highest sequence number that is planned to be flushed to disk storage, along with all other recovery information that has LSNs less than the identified LSN=1000 (i.e., LSN=999, LSN=998 . . . etc.), thus clearing the recovery log buffer to enable acceptance of subsequent recovery information from file system activity performed on the node.

Prior to performing the flushing of the recovery information to disk storage, the LSN identified by the recovery log buffer is received by event log program 300, and event log program 300 determines the event information in the event log buffer having LSNs equal to or less than the LSN identified by the recovery log buffer. For example, event log program 300 receives LSN=1000 corresponding to the recovery information in the recovery log buffer intended to be flushed to persistent disk storage in the recovery log. Event log program 300 determines the event information associated with events having LSNs equal to or less than LSN=1000. Event log program 300 flushes the event information of events with LSN=1000 or less than are in the event log buffer to the event log in persistent storage on disk. Event log program 300 communicates the completion of flushing the event information to disk to the recovery log buffer, after which the recovery log buffer performs a flush of recovery information from the buffer to the recovery log in persistent storage on disk.

In some embodiments, event log program 300 determines that the event log buffer is at or near capacity and initiates a flush of event information to the event log on disk, without initiation of an LSN identified by the recovery log buffer. In some embodiments, event log program 300 determines that the event log buffer does not include event information with an LSN equal to or less than the LSN identified by the recovery log buffer, in which case event log program 300 does not perform a flush of event information, and instead communicates completion to the recovery log buffer to initiate the flushing of the recovery log buffer.

Sink 140 is a software application that receives event notification deliveries from the respective producers 117, 127, 137 of the first server node 110, second server node 120, and Nth server node 130, via the message queue. Sink 140 provides an interface for storage system monitoring applications to access the event notifications, determine the state and status of components of the file system cluster, and perform monitoring activities of the files system cluster.

Storage system applications 160 include one or more applications that provide file system storage management and coordination services for the file system cluster that includes first server node 110, second server node 120, intervening server nodes (not shown), and Nth server node 130. In some embodiments event log program 300 performs as a module component of storage system applications 160.

Storage system monitoring applications 170 include a collection of client-side applications that access event notifications from sink 140 and monitor the respective state, status, file, and directory activities of the file system. Storage system monitoring applications 170 utilize uninterrupted delivery of event notifications to maintain consistent monitoring of respective file system components and content, and uses event metadata, to determine the state, status, and activity associated with cataloging operations applied to the clustered file system. Storage system monitoring applications 170 use delivered event notifications that include activities such as system status, number of files, number of directories, detection of files to archive, determine users accessing files, determine content attributes (confidential files), determine heavy access, and provide services across the distributed storage environment.

Figure 2:
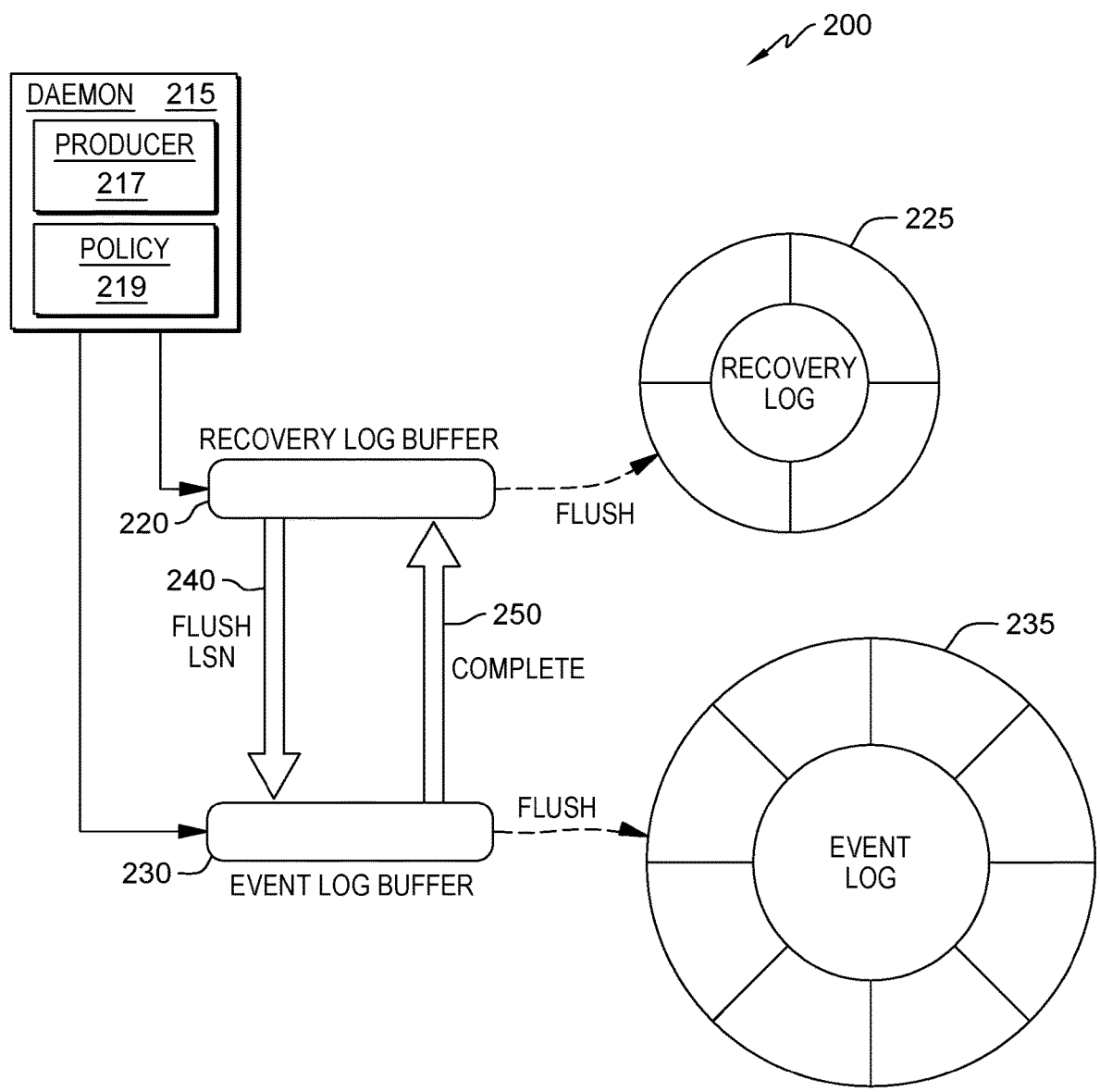
FIG. 2 is a functional block diagram illustrating an example of flushing of an event log buffer to an event log in persistent disk storage, in accordance with embodiments of the present invention.

FIG. 2 is a functional block diagram illustrating an example of flushing of an event log buffer to an event log in persistent disk storage, in accordance with embodiments of the present invention. FIG. 2 includes daemon 215, recovery log buffer 220, recovery log 225, event log buffer 230, event log 235, flush LSN 240, and completion response 250. Daemon 215 includes producer 217 and policy 219. Daemon 215 runs as a background application in a node of the file system cluster as described above with respect to daemons 115, 125, and 135. Producer 217 determines file system event activity on the node, collects metadata for the event, and publishes the event and metadata to the message queue. Producer 217 sends the event information, including metadata associated with the event performed by the node, to event log buffer 230. In some embodiments, producer 217 sends recovery information to recover log buffer 220.

Policy 219 includes rules and conditions associated with the access and recording of event information associated with the file system. In some embodiments, policy 219 determines the events of which files and activities that are included in the notifications published by producer 217.

Recovery log buffer 220 collects recovery information associated with event activities of the file system performed on the respective node. Recovery log buffer 220 resides in volatile memory and writes the recovery information for a file system, held in recovery log buffer 220 to recovery log 225, which resides in persistent memory on disk. Recovery log buffer 220 receives information for recovering from a processing interruption, such as a crash, node or component failure, or reboot.

Recovery log buffer 220 determines when the capacity of the buffer is full or nearly full and sends flush LSN 240 to event log buffer 230. Event log program 300 uses flush LSN 240 to determine the event information included in event log buffer 230 that corresponds to the recovery information in recovery log buffer 220, to flush to event log 235, which is located in persistent storage on disk. Flush LSN 240 enables event log program 300 to maintain event log buffer 230 in synch with recovery log buffer 220. Recovery log buffer 220 receives completion response 250 from event log program 300 subsequent to flushing of the event information corresponding to flushing LSN 240 or LSN less than flushing LSN 240 from event log buffer 230 to event log 235, which resides in persistent storage on disk.

Event log buffer 230 receives event information from producer 217 associated with respective event activity performed on the node. Event log buffer 230 appends the event information of respective event activities to a JSON file. Flush LSN 240 is received by event log program 300 and reflects the set of recovery information to be flushed from recovery log buffer 220 as the recovery log buffer becomes full. The set of recovery information includes the recovery information with corresponding LSNs equal to or less than flush LSN 240. Event log program 300 uses received flush LSN 240 to determine whether event log buffer 230 includes event information corresponding to the set of recovery information identified by flush LSN 240. If event log buffer 230 includes event information corresponding to LSNs less than or equal to flush LSN 240, then event log program 300 initiates flushing of the identified event information from event log buffer 230 to event log 235 on persistent storage on disk. Flushing of event log buffer event information prior to flushing of recovery log buffer 220 ensures that the event log information on persistent storage contains event information that is consistent with the file system state to be replayed for event notification delivery in the event of an interruption of failure of the file system event notification delivery via the message queue and sink.

Flush LSN 240 includes a log sequence number that corresponds to recovery information for a file system activity designated to be flushed from recovery log buffer 220 to recovery log 225. Flushing of recovery log buffer 220 also includes recovery information corresponding to LSNs less than flush LSN 240 that are currently in recovery log buffer 220. Event log program 300 can utilize flush LSN 240 to determine the event information in event log buffer 230 to flush to event log 235. The flushing of event information includes event information with corresponding LSNs less than flushing LSN 240 that are included in event log buffer 230.

Completion response 250 is a communication from event log program 300 that confirms the flushing of event log buffer 230 is complete and indicates that flushing of recovery log buffer 220 can initiate. In embodiments of the present invention, event log buffer 230 flushes event information to event log 235, based on event information having LSNs equal to or less than flush LSN 240, prior to flushing of recovery information of recovery log buffer 220 to recovery log 225. In some embodiments, event log buffer 230 may flush event information to event log 235 due to event log buffer 230 being near or at capacity. In embodiments in which event log program 300 determines that event log buffer 230 does not include event information with corresponding LSNs equal to or less than flush LSN 240, event log program 300 communicates completion response to recovery log buffer 220 to initiate the flushing of recovery information to recovery log 225.

Figure 3:
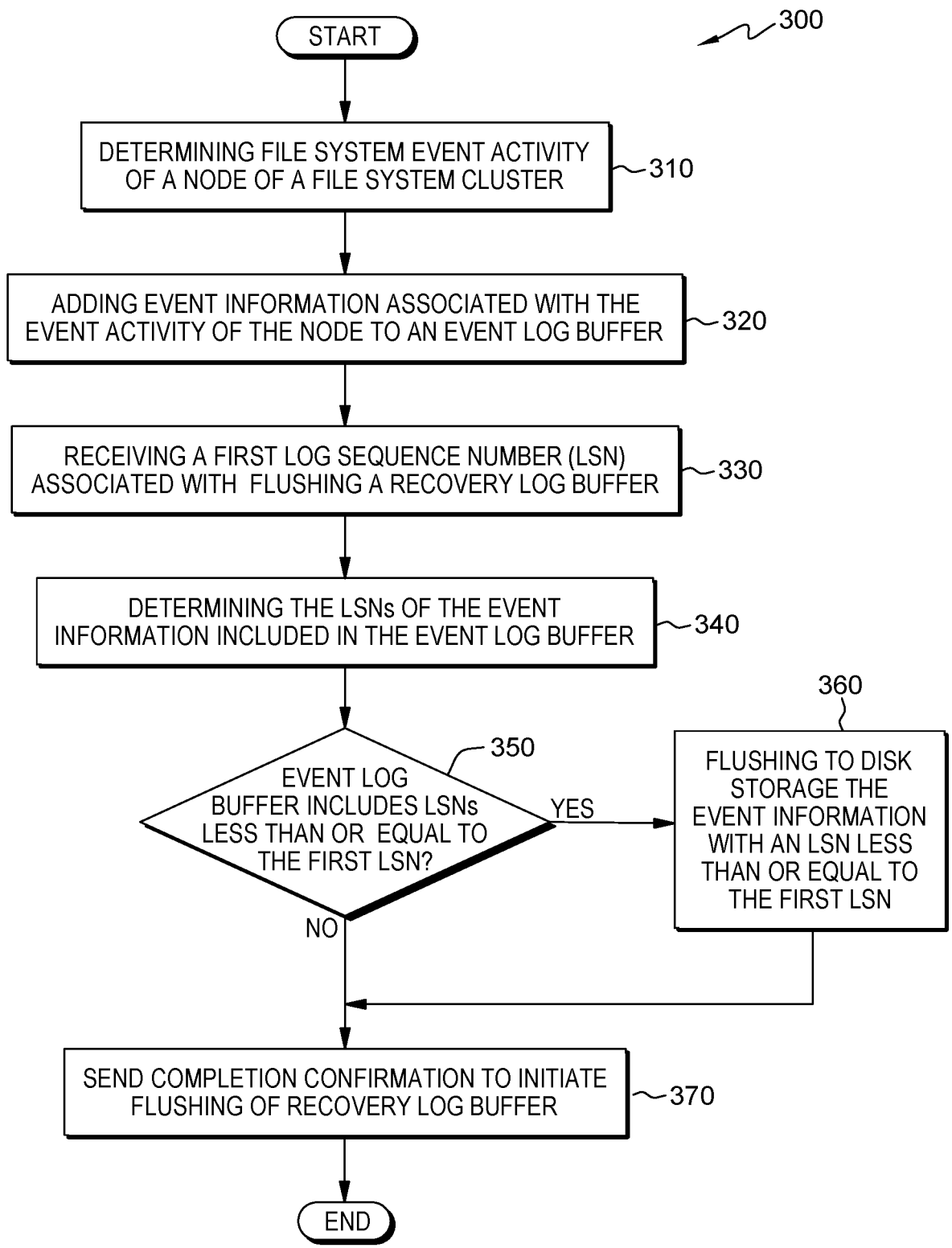
FIG. 3 is a flowchart depicting the operational steps of an event log program operating in the distributed data processing environment of FIG. 1, in accordance with embodiments of the present invention.

FIG. 3 is a flowchart depicting the operational steps of an event log program operating in the distributed data processing environment of FIG. 1, in accordance with embodiments of the present invention. Event log program 300 receives a log sequence number reflecting the set of recovery information that is designated to be flushed from the recovery log buffer of the node to the recovery log in persistent storage. The designated flushing includes the recovery information with LSNs equal to or less than the received log sequence number. Event log program 300 determines whether the event log buffer includes event information having corresponding LSNs that are equal to or less than the received LSN from the recovery log buffer.

Event log program 300 determines a file system event activity of a node of a file system cluster (step 310). Event log program 300 determines the initiation of a file access activity performed by the node. Event log program 300 determines the type of activity and the metadata associated with the event activity included as event information. For example, first server node 110 receives an instruction to perform a write operation to a file of the file system. Event log program 300 of first server node 110 detects the file event activity and prepares to receive metadata corresponding to the event activity performed on the node.

Event log program 300 adds event information associated with the event activity of the node to an event log buffer (step 320). Event log program 300 receives the event information of the event activity, which includes metadata associated with the activity and the file on which the event activity is performed. Event log program 300 receives the event information, which is uniquely associated with the particular event activity, to form a JSON message and appends the message to an event log buffer residing in volatile memory. The event log buffer collects the event information for multiple event activities on the node and is coordinated with the addition of recovery information associated with the particular event activity that is provided to a recovery log buffer, also residing in volatile memory.

For example, having received the event information that includes specific metadata associated with a write operation to a file of the file system, performed on first server node 110, event log program 300 appends the event information to a JSON file of the event log buffer. The event information includes metadata specifically associated with the write operation performed on the file of the file system to which the write operation is directed. The event information receives a log sequence number (LSN) that uniquely identifies the metadata associated with the particular write event activity. The write event activity also generates a corresponding set of recovery information that is uniquely associated with the particular write activity and is sent to the recovery log buffer residing in memory. The event information includes significantly more metadata details associated with the write event activity to the particular file, whereas the recovery information includes only information to support a fault recovery on the node. The recovery log buffer receives the same log sequence number (LSN) for the received recovery information as the event log buffer received for the event information for the same write event activity.

Event log program 300 receives a first log sequence number (LSN) associated with flushing a recovery log buffer (step 330). The term "first" log sequence number is used to distinguish the particular LSN from other LSNs and does not necessarily correspond to an initial LSN, such as 0001. The recovery log buffer continues to receive recovery information associated with event activity on the node. Event log program 300 receives an LSN as the recovery log buffer reaches a capacity level, or near the capacity level of adding recovery information to the recovery log buffer. The LSN received by event log program 300 corresponds to a higher or highest sequence number LSN of recovery information currently held in the recovery log buffer to be flushed to disk, and the flush of recovery information includes all LSNs equal to or less than the first LSN. Event log program 300 receives the same first LSN as that designated for the recovery log buffer flush to establish synchronization between the recovery log buffer and the event log buffer.

For example, recovery log buffer 220 (FIG. 2) determines that recovery log buffer 220 is near capacity and needs to flush the recovery information that is held in recovery log buffer 220 to recovery log 225 located on disk. Recovery log buffer 220 sends an LSN (flush LSN 240) to event log program 300 to be used to flush event log buffer 230. The flush LSN 240 that is sent corresponds to the same LSN having a higher or highest sequence number of the recovery information currently held in recovery log buffer 220 that is intended to be flushed. The flush of recovery information includes all LSNs equal to or less than flush LSN 240, and event log program 300 uses the same flush LSN 240 to determine the event information to flush to event log 235 on disk.

Event log program 300 determines the LSNs of the event information included in the event log buffer (step 340). Event log program 300 uses the LSNs of the event information included in the event log buffer to establish a range of LSNs currently held in the event log buffer. The LSNs of the unique instances of event information added to the event log buffer are used to determine the set of event information corresponding to individual event activities that will be flushed to the event log residing on disk.

Event log program 300 determines whether the event log buffer includes LSNs that are less than or equal to the first LSN (decision step 350). For the case in which event log program 300 determines that there are no LSNs currently in the event log buffer that are equal to or less than the received first LSN (step 350, "NO" branch), event log program 300 sends a completion confirmation message initiating the flushing of the recovery information of the recovery log buffer to the recovery log residing on disk (step 370).

For example, event log program 300 receives a first LSN=1000, indicating flushing of event information with LSNs corresponding to less than or equal to LSN=1000. Event log program 300 determines that the LSNs in the event log buffer all exceed LSN=1000 from a flushing action associated with event information nearing the capacity of event log buffer 230, which occurred independent of coordination with recovery log buffer 220. Event log program 300 sends completion response 250 (FIG. 2) to initiate the flushing of recovery log buffer 220.

Having sent a completion confirmation to initiate the flushing of the recovery log buffer, event log program 300 ends but remains active for the detection of additional event activity performed on the node. In some embodiments of the present invention, event log program 300 detects a fault condition interrupting delivery of event notifications and initiates a replay of event notifications from the last confirmed event information LSN, from the event log residing in persistent storage. Providing replay of safely stored event notification ensures reliability in the delivery of event notifications to internal and/or external sinks.

For the case in which event log program 300 determines that the event log buffer includes event information with LSNs less than or equal to the received first LSN (step 350, "YES" branch), event log program 300 flushes to the event log on disk the event information with LSNs less than or equal to the first LSN (step 360). Event log program 300 initiates the flushing of the set of event information, each of which corresponds to a distinct event activity performed on the node, to the event log residing in persistent storage on disk.

Having performed a flush of the event information designated by LSNs less than or equal to the received first LSN, event log program 300 sends a completion confirmation to initiate the flushing of the recover log buffer (step 370) and proceeds as described above. Embodiments of the present invention recognize that the recovery information and the event information flushed to disk is coordinated by the designated LSN range defined by event LSNs less than or equal to the first LSN. Embodiments further recognize that by flushing the event log buffer prior to flushing of the recovery log buffer, a reliable, protected source of event notifications and corresponding metadata is secured and available to replay upon detection of a fault condition or interruption of delivery of event notifications from the node.

Having sent a completion confirmation to initiate the flushing of the recovery log buffer, event log program 300 ends but remains active for the detection of additional event activity performed on the node. In some embodiments of the present invention, event log program 300 detects a fault condition interrupting delivery of event notifications and initiates a replay of event notifications from the last confirmed event information LSN, from the event log residing in persistent storage. Providing replay of safely stored event notification ensures reliability in the delivery of event notifications to internal and/or external sinks.

Figure 4:
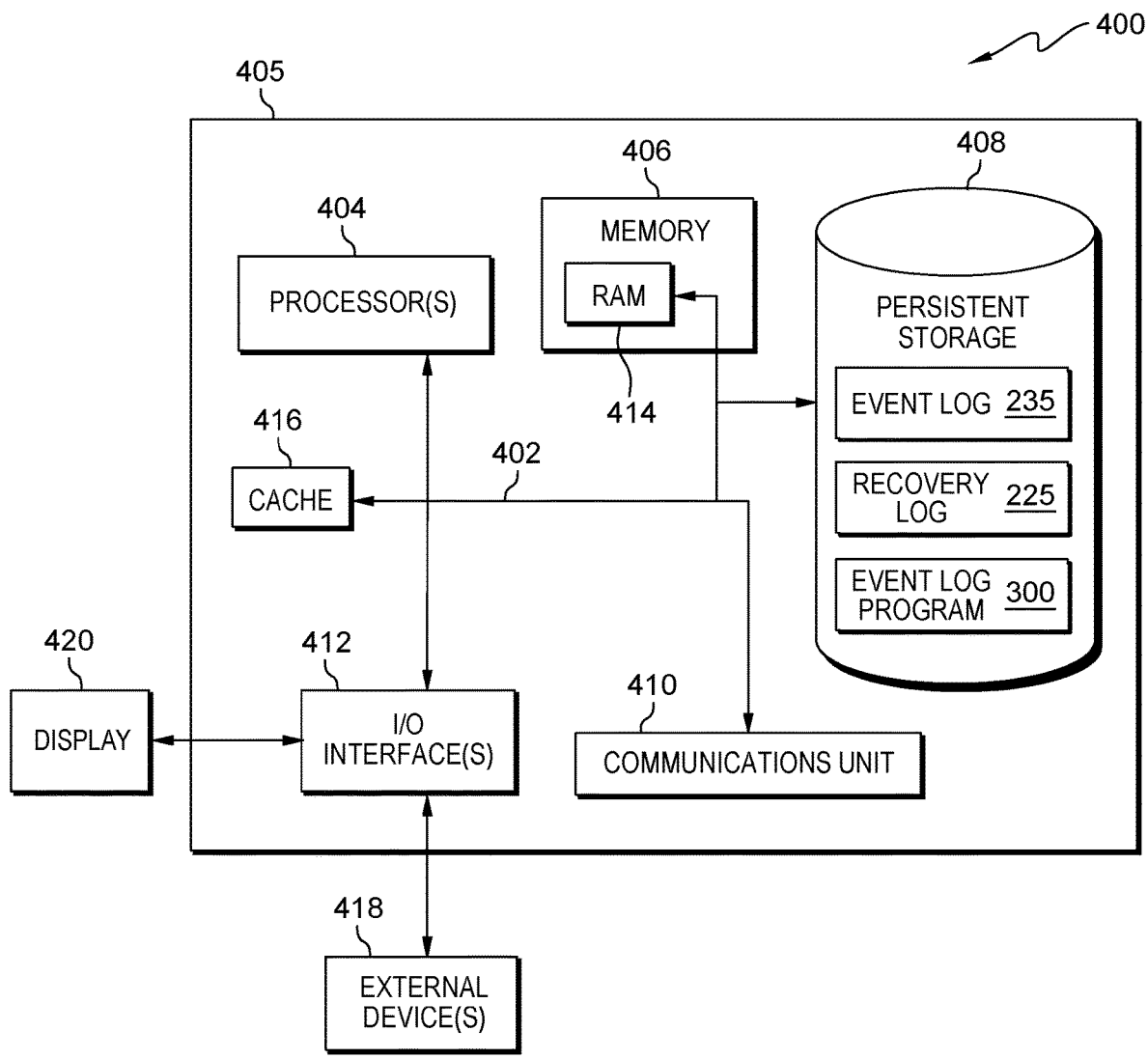
FIG. 4 depicts a block diagram of components of a computing system, including a computing device configured to operationally perform the event log program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform event log program 300 of FIG. 3, in accordance with an embodiment of the present invention.

Computing device 405 includes components and functional capability similar to components of first server node 110, second server node 120, and Nth server node 130 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, event log program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information. In one embodiment of the present invention, recovery log 225 and event log 235 are included in persistent storage 408.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Event log program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., event log program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for fault tolerance in delivery of event information within a computer cluster of nodes, the method comprising:
    determining, by one or more processors, event information associated with file system event activity performed by a node of a computer cluster of nodes;
    adding, by the one or more processors, the event information of the file system event activity to an event log buffer of the node, including a log sequence number uniquely corresponding to the event activity and matching a recovery log sequence number for the event activity, and wherein the event information includes metadata associated with the event activity that is absent from recovery log information associated with the event activity;
    receiving, by the one or more processors, a first log sequence number matching a recovery log buffer sequence number corresponding to flushing of recovery information from the recovery log buffer of the node based on a capacity limit of the recovery log buffer;
    determining, by the one or more processors, whether at least some of the event information included in the event log buffer have a log sequence number less than or equal to the first log sequence number; and
    responsive to determining at least some of the event information included in the event log buffer corresponds to a log sequence number less than or equal to the first log sequence number, flushing, by the one or more processors, the event information having corresponding log sequence numbers less than or equal to the first log sequence number from the event log buffer to disk storage prior to flushing the recovery log buffer information with a log sequence number less than or equal to the first log sequence number.

2. The method of claim 1, further comprising:
    in response to determining a lack of correspondence between the event information included in the event log buffer and log sequence numbers less than or equal to the first log sequence number, sending, by the one or more processors, a confirmation response to the recovery log buffer, initiating flushing of recovery information included in the recovery log buffer, without performing a flushing of event information from the event log buffer.

3. The method of claim 1, further comprising:
    sending, by the one or more processors, the event information of at least one file system activity performed on the node that has been flushed to disk storage to a sink, in response to detecting a fault state of the node of the computer cluster of nodes.

4. The method of claim 1, wherein the event information includes metadata corresponding to a particular file system activity performed on the node of the computer node cluster, (which includes information about the event activity in addition to the information included in the recovery log buffer).

5. The method of claim 1, wherein a respective node of the computer node cluster includes a producer, and a message queue as a sink, and wherein the sink is an event notification access repository external to the computer node cluster.

6. The method of claim 1, wherein a respective node of the computer node cluster includes a producer, and an event log file on persistent storage as a sink, and wherein the sink is an event notification access repository external to the computer node cluster.

7. The method of claim 1, wherein a respective event activity performed on the node of the computer node cluster receives a log sequence number uniquely corresponding to the event information associated with the respective event activity.

8. The method of claim 1, wherein flushing the event information, further comprises:
flushing, by the one or more processors, the event information having corresponding log sequence numbers from the event log buffer to an event log on disk storage; and
flushing, by the one or more processors, the recovery information to a recovery log on disk storage, subsequent to the flushing of the event information having corresponding log sequence numbers to the event log on disk storage.

9. A computer program product for fault tolerance in delivery of event information of nodes within a computer node cluster, the computer program product comprising:
one or more computer-readable storage media, and program instructions stored on the one or more computer-readable storage media, the program instructions comprising:
program instructions to determine event information associated with file system event activity performed by a node of a computer cluster of nodes;
program instructions to add the event information of the file system event activity to an event log buffer of the node, including a log sequence number uniquely corresponding to the event activity and matching a recovery log sequence number for the event activity, and wherein the event information includes metadata associated with the event activity that is absent from recovery log information associated with the event activity;
program instructions to receive a first log sequence number matching a recovery log buffer sequence number corresponding to flushing of recovery information from the recovery log buffer of the node of the node based on a capacity limit of the recovery log buffer;
program instructions to determine whether at least some of the event information included in the event log buffer have a log sequence number less than or equal to the first log sequence number; and
responsive to determining at least some of the event information included in the event log buffer corresponds to a log sequence number less than or equal to the first log sequence number, program instructions to flush the event information having corresponding log sequence numbers less than or equal to the first log sequence number from the event log buffer to disk storage prior to flushing the recovery log buffer information with a log sequence number less than or equal to the first log sequence number.

10. The computer program product of claim 9, further comprising program instructions, stored on the one or more computer readable storage media, to:
send, in response to determining a lack of correspondence between the event information included in the event log buffer and log sequence numbers less than or equal to the first log sequence number, a confirmation response to the recovery log buffer, initiating flushing of recovery information included in the recovery log buffer, without performing a flushing of event information from the event log buffer.

11. The computer program product of claim 9, further comprising program instructions, stored on the one or more computer readable storage media, to:
send the event information flushed to disk storage to a sink, in response to detecting a fault state of the node of the computer cluster of nodes.

12. The computer program product of claim 9, wherein the event information includes metadata corresponding to a particular file system activity performed on the node of the computer node cluster.

13. The computer program product of claim 9, wherein a respective node of the computer node cluster includes a producer, and a message queue as a sink.

14. The computer program product of claim 9, wherein a respective node of the computer node cluster includes an event log file on persistent storage as a sink.

15. The computer program product of claim 9, wherein a respective event activity performed on the node of the computer node cluster receives an LSN uniquely corresponding to the event information associated with the respective event activity.

16. The computer program product of claim 9, wherein the event information having the corresponding log sequence numbers less than or equal to the first log sequence number are flushed from the event log buffer to an event log residing in persistent storage, and the event information flushed to the event log corresponds to the recovery information subsequently flushed from the recovery log buffer to a recovery log residing in persistent storage.

17. A computer system for fault tolerance in delivery of event information of nodes within a computer node cluster, the computer system comprising:
one or more computer processors;
one or more computer-readable storage media, and program instructions stored on the one or more computer-readable storage media, the program instructions comprising:
program instructions to determine event information associated with file system event activity performed by a node of a computer cluster of nodes;
program instructions to add the event information of the file system event activity to an event log buffer of the node, including a log sequence number uniquely corresponding to the event activity and matching a recovery log sequence number for the event activity, and wherein the event information includes metadata associated with the event activity that is absent from recovery log information associated with the event activity;
program instructions to receive a first log sequence number matching a recovery log buffer sequence number corresponding to flushing of recovery information from the recovery log buffer of the node based on a capacity limit of the recovery log buffer;
program instructions to determine whether at least some of the event information included in the event log buffer have a log sequence number less than or equal to the first log sequence number; and
responsive to determining at least some of the event information included in the event log buffer corresponds to a log sequence number less than or equal to the first log sequence number, program instructions to flush the event information having corresponding log sequence numbers less than or equal to the first log sequence number from the event log buffer to disk storage prior to flushing the recovery log buffer information with a log sequence number less than or equal to the first log sequence number.

18. The computer system of claim 17, further comprising program instructions, stored on the computer readable storage media for execution by at least one of the one or more processors, to:
send, in response to determining a lack of correspondence between the event information included in the event log buffer and log sequence numbers less than or equal to the first log sequence number, a confirmation response to the recovery log buffer, initiating flushing of recovery information included in the recovery log buffer, without performing a flushing of event information from the event log buffer.

19. The computer system of claim 17, wherein the event information includes metadata corresponding to a particular file system activity performed on the node of the computer node cluster.

20. The computer system of claim 17, wherein a respective event activity performed on the node of the computer node cluster generates an log sequence number (LSN) for the event log buffer that matches an LSN associated with recovery information of the recovery log buffer of the node, for a same respective event activity.

21. The computer system of claim 17, wherein the event information having the corresponding log sequence numbers less than or equal to the first log sequence number is flushed from the event log buffer to an event log residing in persistent storage, and the event information flushed to the event log corresponds to the recovery information subsequently flushed from the recovery log buffer to a recovery log residing in persistent storage.

22. A method for replaying undelivered event information due to a fault state of a node within a computer node cluster, the method comprising:
determining, by one or more processors, a fault state of a first node of a computer node cluster of a storage system;
accessing, by the one or more processors, event information of events performed on the first node of the computer node cluster of a storage system, stored on an event log residing in persistent storage, wherein the event information is uniquely identified by a log sequence number (LSN) corresponding to an event activity performed on the node, and wherein an event notification includes delivery of the event information of the event activity;
determining, by the one or more processors, an LSN of a last event notification delivered to a sink of the storage system, wherein the sink is a receiving repository of a plurality of event notifications of the storage system;
identifying, by the one or more processors, one or more event notifications with LSNs greater than the LSN of the last event notification delivered to the sink; and
replaying, by the one or more processors, the one or more event notifications with LSNs greater than the LSN of the last event notification delivered to the sink, from the event log to the sink of the storage system.

23. The method of claim 22, wherein the sink is an event notification access repository external to the computer node cluster.

24. A computer system for replaying undelivered event information due to a fault state of a node within a computer node cluster, the computer system comprising:
one or more computer processors;
one or more computer-readable storage media, and program instructions stored on the one or more computer-readable storage media, the program instructions comprising:
program instructions to determine a fault state of a first node of a computer node cluster of a storage system;
program instructions to access event information of events performed on the first node of the computer node cluster of a storage system, stored on an event log residing in persistent storage, wherein the event information is uniquely identified by a log sequence number (LSN) corresponding to an event activity performed on the node, and wherein an event notification includes delivery of the event information of the event activity;
program instructions to determine an LSN of a last event notification delivered to a sink of the storage system, wherein the sink is a receiving repository of a plurality of event notifications of the storage system;
program instructions to identify one or more event notifications with LSNs greater than the LSN of the last event notification delivered to the sink; and
program instructions to replay the one or more event notifications with LSNs greater than the LSN of the last event notification delivered to the sink, from the event log to the sink of the storage system.

25. The computer system of claim 24, wherein the sink is an event notification access repository external to the computer node cluster.

* * * * *